United States Patent [19]
Weidler

[11] 4,317,552
[45] Mar. 2, 1982

[54] UNIVERSAL TRIPOD FOR SUPPORTING A CAMERA OR THE LIKE

[76] Inventor: Charles H. Weidler, 926 First St., Lancaster, Pa. 17603

[21] Appl. No.: 106,532

[22] Filed: Dec. 26, 1979

[51] Int. Cl.³ .............................................. F16M 11/38
[52] U.S. Cl. ..................................... 248/168; 211/203
[58] Field of Search ............... 248/168, 165, 164, 170, 248/171, 188.7, 167, 434, 435; 211/203, 205

[56] References Cited

U.S. PATENT DOCUMENTS

| | | | |
|---|---|---|---|
| 737,951 | 9/1903 | McEachern | 403/93 X |
| 838,443 | 12/1906 | Owings | 403/93 |
| 1,058,463 | 4/1913 | Pringle | 403/93 X |
| 1,502,629 | 7/1924 | Hardy | 248/435 |
| 1,519,246 | 12/1924 | Forshee et al. | 403/93 X |
| 1,897,449 | 2/1933 | Trowbridge | 248/168 X |
| 2,171,870 | 9/1939 | Swartz | 248/168 |
| 2,353,513 | 7/1944 | Simmon | 248/168 X |
| 2,467,567 | 4/1949 | Price . | |
| 2,691,501 | 10/1954 | Spencer . | |
| 3,921,947 | 11/1975 | Adam . | |

FOREIGN PATENT DOCUMENTS

| | | | |
|---|---|---|---|
| 93491 | 10/1897 | Fed. Rep. of Germany | 248/170 |
| 52-14414 | 3/1977 | Japan | 248/168 |

*Primary Examiner*—J. Franklin Foss
*Attorney, Agent, or Firm*—Frederick Raring

[57] ABSTRACT

Universal tripod comprises a tripod hub, tripod legs and clamping means for the legs. The legs are independently pivotally mounted on the hub and are each arcuately movable from a closed position, in which they are clustered around the tripod axis, to an extended position in which they may extend at an angle of up to about 120 degrees from the axis. The leg clamping means comprises a locking dog for each of the legs and a single clamping member which is movable between an unlocking and a locking position. When the clamping member is in its locking position, the legs are securely clamped against arcuate movement.

10 Claims, 9 Drawing Figures

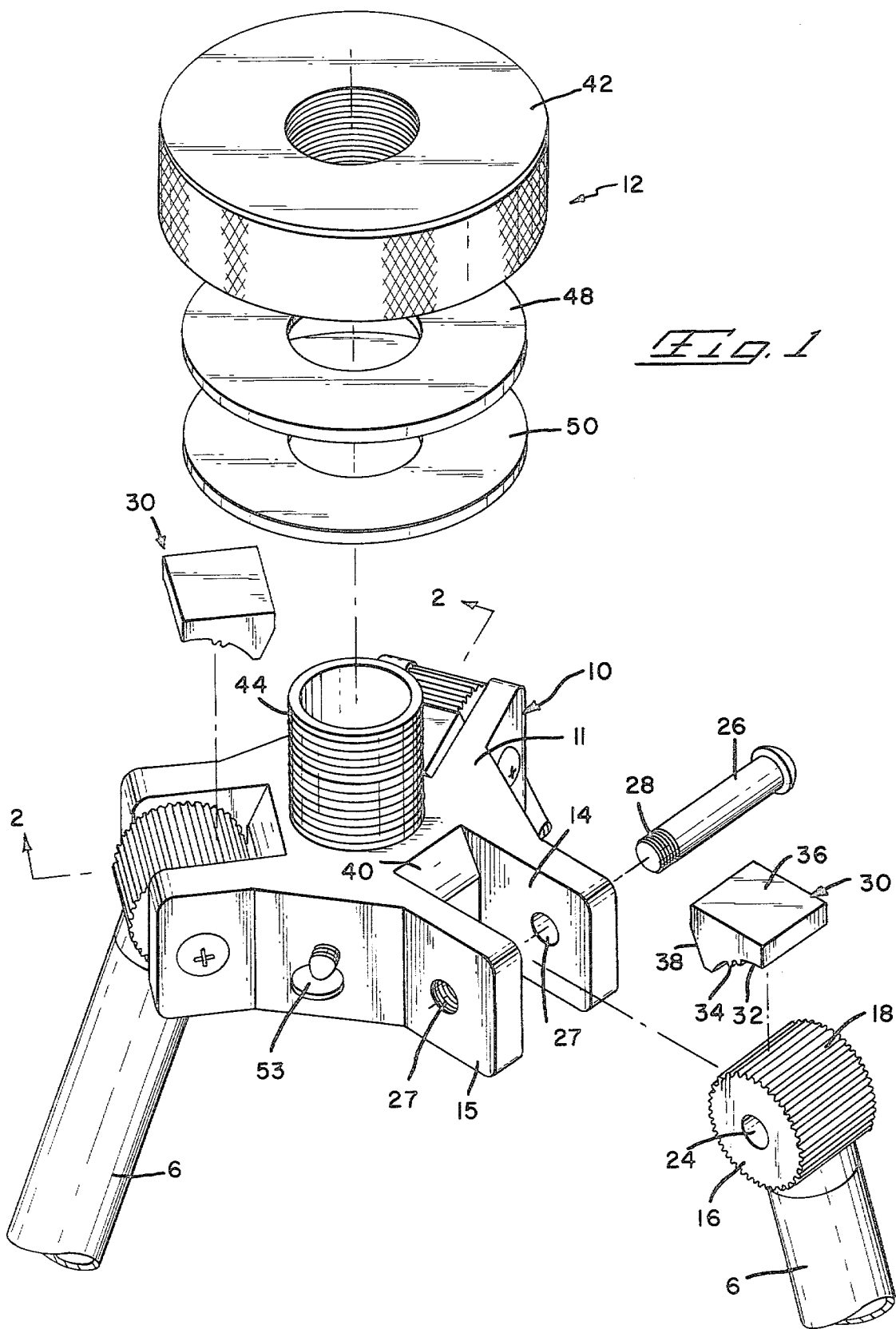

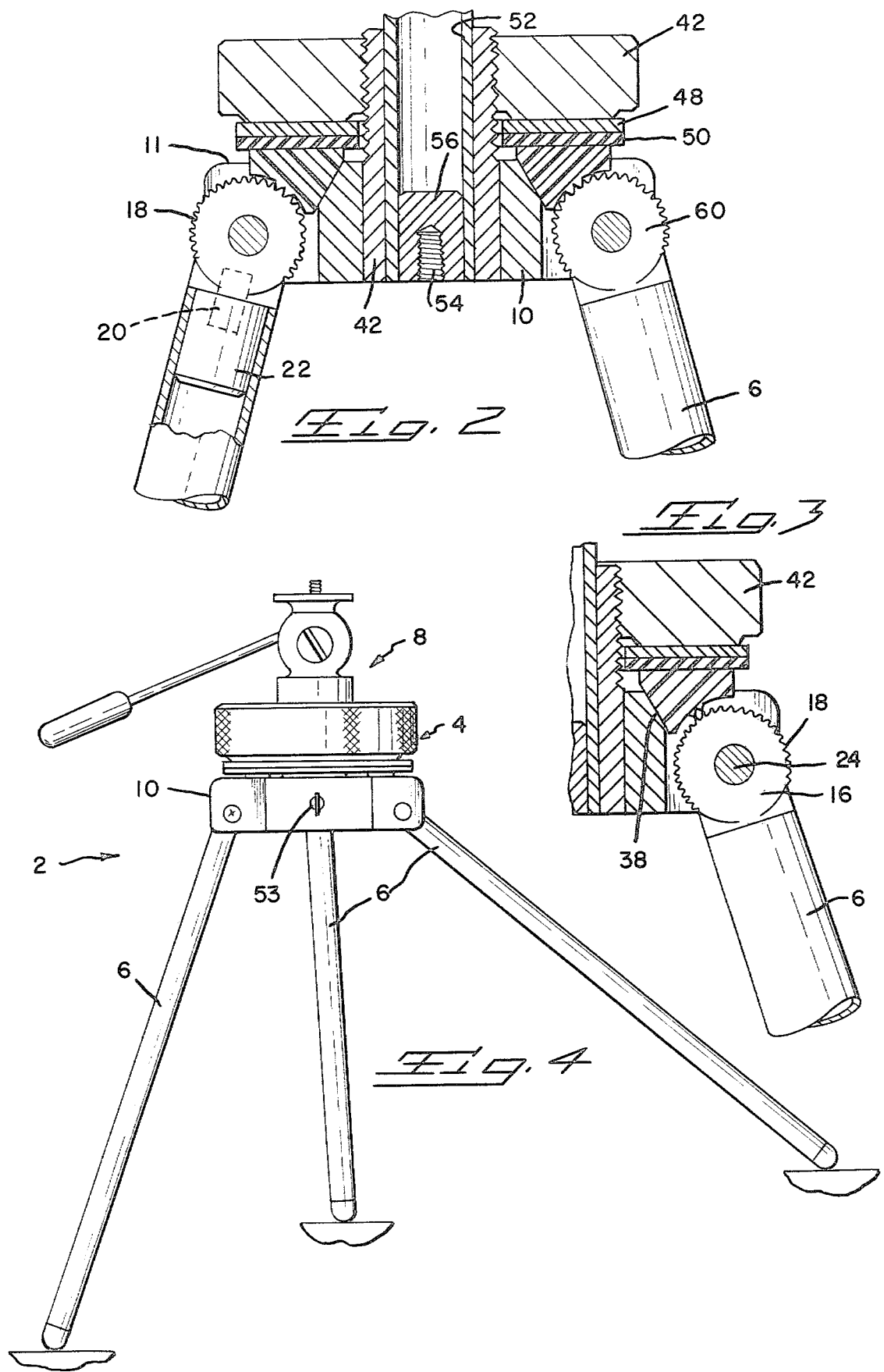

UNIVERSAL TRIPOD FOR SUPPORTING A CAMERA OR THE LIKE

FIELD OF THE INVENTION

This invention relates to tripods particularly of the type which have independently pivoted legs so that they can be used on irregular surfaces.

BACKGROUND OF THE INVENTION

A conventional tripod of the type used by photographers comprises a tripod hub and three legs pivoted to the hub and arcuately movable from closed positions to extended positions in which all of the legs extend at the same angle with the tripod axis, usually about 40 degrees. The legs are normally composed of two or three telescoping sections so that they can be lengthened at will. Conventional tripods of this type are satisfactory when used on a level surface in that the legs are merely moved to their extended positions and the tripod is positioned on the surface. If it is desired to raise the instrument being supported by the tripod, the extensions on the legs are pulled out by a uniform amount. When however a conventional tripod is used on an irregular surface such as the side of a bank or hill or on a rocky surface, the telescoping sections of the three legs must be extended to different lengths if the head of the tripod is to support the camera in a level position. This operation is time consuming and inconvenient for a photographer who requires the use of a tripod on an uneven terrain. Furthermore, a conventional tripod cannot be positioned on a surface such that the camera is relatively close to the surface; the minimum height is usually that height which is obtained when the camera is positioned on the surface with the leg sections fully telescoped into each other.

The present invention is directed to the achievement of a universal tripod, which, with very little adjustment, can readily be set up on an irregular surface such as a sloping surface or a surface covered with rocks. The invention is further directed to the achievement of a tripod which can be set on a surface such that the head of the tripod, and therefore the camera or other device mounted on the head, is very close to the surface. This feature of the invention is of value to photographers engaged in photographing objects such as flowers or rock formations.

A tripod in accordance with the invention comprises a tripod hub having three tripod legs independently pivoted thereto for arcuate movement between closed positions, in which the legs are clustered around the tripod axis, to extreme extended positions in which each of the legs extend at an angle of about 120 degrees with respect to the tripod axis. A leg clamping means is provided comprising a locking dog for each of the tripod legs and a locking member, or clamping member, movably mounted on the hub for movement between a locking position and an unlocking position. When the locking member is moved to its locking position, the individual locking dogs are simultaneously moved into engagement with their associated tripod legs thereby to lock the legs in the positions they occupy. Moreover, it is merely necessary in setting up the tripod to hold the tripod by the hub with the locking member in its unlocked position and lower the tripod towards the surface so that the legs are splayed outwardly as they come into contact with the surface. The locking member is then moved to its locking position and the legs will be rigidly and securely held against movement so that the tripod will set firmly on the surface.

DESCRIPTION OF THE DRAWINGS

FIG. 1 is a fragmentary perspective view, with some parts exploded, of the head assembly of a tripod in accordance with the invention.

FIG. 2 is an irregular cross sectional view taken along the lines of 2—2 of FIG. 1 showing the positions of the parts when the locking member is in its locking position and the legs are clamped and locked against arcuate movement.

FIG. 3 is a fragmentary view similar to FIG. 2 showing the positions of the parts when the locking member is in its unlocked position and the legs are free to move arcuately independent of each other.

FIG. 4 is a side view of a tripod supported on an irregular surface with the three locations of support being at different elevations.

Figure 5:
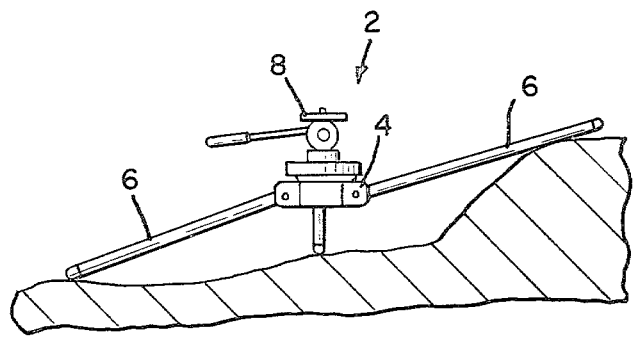
FIG. 5 is a side view of the tripod illustrating its use on an extremely irregular surface and further illustrating the fact that the tripod head can be located close to the surface.

Referring first to FIGS. 1-4, a tripod 2 in accordance with the invention comprises a hub assembly 4, three tripod legs 6 pivoted to the hub assembly, and a mounting means 8 on the hub assembly having a mounting for a camera or the like thereon.

The hub assembly comprises a hub frame 10 having an upper surface 11, as viewed in the drawing, and a clamping means generally indicated at 12 which is above the surface 11. The hub frame has three pairs of spaced apart ears 15 extending laterally therefrom at equally spaced angular intervals around the axis of the tripod, each pair of ears defining a recess 14 which receives a cylindrical gear-like member 16 on the end of one of the tripod legs 6. The gear-like member 16 is secured to the leg as shown in FIG. 2 by means of a plug 22, which is fitted into the hollow interior of the leg, and a pin 20 which extends into the plug and into a drilled hole in the member 16. The member 16 has serrations or teeth 18 extending across its arcuate surface for engagement with complimentary teeth 34 on a locking dog 30 described below.

The legs are pivotally mounted on the hub frame by means of pivot pins 26 which extend through aligned holes 27 in the ears and through a central hole 24 in the member 16. The pin 26 has a threaded end as shown at 28 and one of the ears is also provided with a threaded hole to secure the pin after assembly of the parts.

Each leg 6 has associated therewith a locking dog 30 which is positioned in the associated recess 14 and which has an upper surface 36 which is normally located above the level of the surface 11 of the hub frame 10. Dog 30 has an arcuate surface 32 on its outwardly facing side, the radius of which substaneially conforms to the radius of the gear-like member 16. Teeth or serrations 34 are provided on surface 32 for engagement with the teeth 18 on member 16 as described below. Each locking dog 30 is slidably positioned in a recess 14 for movement towards and away from the gear-like member 16 in the recess.

An inclined surface 40 is provided at the inner end of the recess and a complimentary inclined surface 38 is provided on the locking dog 30 so that the dog will move radially towards the axis of the pin 24 as shown in FIGS. 2 and 3.

The clamping means 12 comprises locking nut 42, a metallic washer 48, and a resilient gasket or clamping pad 50 located above the surface 11 of the hub frame. The locking nut 42 is threaded on the upper end 44 of a sleeve 46 which is fitted in a central opening in the upper frame 10 and secured thereto by means, not shown, such as a key or a weldment. The metal washer 48 and the circular resilient gasket or clamping pad 50 have oversized central openings so that they can move freely in an axial direction with respect to the upper end 44 of the sleeve.

The locking nut 42 is in its unlocked position when it is backed off from the surface 11 as shown in FIG. 3 so that the legs can be moved arcuately. When the legs are moved, they will push the locking dogs upwardly to the position of FIG. 3. When the locking nut 42 is rotated to move downwardly to the position of FIG. 2, the locking dogs are simultaneously moved against the arcuate surfaces 28 of the members 16 to lock the legs in the positions they occupy at the time of engagement of the dogs with the legs.

The camera mounting means 8 has a tube or neck portion 52 extending downwardly into the hollow interior of the sleeve 46. The neck 52 is held in the tube or sleeve 46 by means of a set screw 53 which is threaded through an opening in the hub frame 10 and which extends through an opening in the sleeve 46 to the neck 52. A plug 56 is fitted into the tube or neck 52 at the lower end thereof for purposes described below.

In use, and after the camera or other instrument has been secured to the head 8, the hub frame 10 is held with one hand and the locking nut 42 is backed off to the position of FIG. 3 with the other hand thus freeing the legs for independent arcuate movement. The tripod is then positioned on a surface by simply moving the hub frame 10 downwardly so that the legs 6 assume extended positions as required by the irregularities of the terrain. When all three legs touch the surface on which the tripod is being set up, the locking nut is rotated to cause its downward movement to the position of FIG. 2 thereby compressing the resilient member 50 and urging the locking dogs against the members 16. The user's hands can then be removed from the tripod since it will rest on the surface with a high degree of stability.

When the tripod is set up on a level surface, all of the legs will of course assume the same angle with respect to the tripod axis as is the case with a conventional tripod. When the tripod is used on an highly irregular surface, one or more of the legs may extend at an angle in excess of 90 degrees with respect to the tripod axis as shown in FIG. 5. FIG. 5 also illustrates the fact that the tripod can be set up such that the camera is very close to the surface on which the tripod rests, a feature which is particularly advantageous when it is desired to photograph up close small objects such as insects or flowers.

Figure 6:
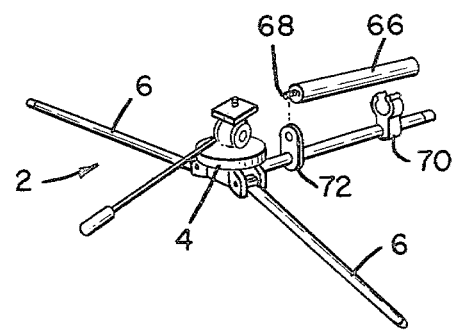
FIG. 6 is a perspective view of the tripod showing the manner of storing an extension member on one of the tripod legs.
Figure 7:
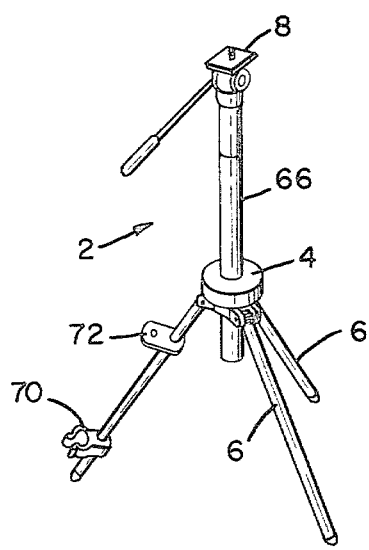
FIG. 7 is a view illustrating the use of the extension member to raise the head of the tripod.

The individual legs 6 can consist of two or more telescoping sections if desired to permit the positioning of a camera in an elevated position. Also, means for raising the camera can be provided as shown in FIGS. 6 and 7 in the form of a rod 66 having a reduced diameter threaded end 68. This rod is carried on one of the legs by means of a clamp 70 and a holding plate 72 when not in use. When it is desired to use the rod 66 to elevate the camera above the level normally achieved, the set screw 53 is loosened and the head is slid from sleeve 46.

The threaded end 68 of the rod 66 is then screwed into a threaded opening 54 in the plug 56 of the neck 52 of the head. Thereafter, the lower end of rod 66 is slid into the sleeve 46 and locked in position by the set screw 53.

The parts of the tripod described above can be made out of metal or in some cases suitable plastic. For example, the locking dogs 30 are preferably of a somewhat compressible plastic material so that they can be firmly engaged with the teeth 18 of the member 16 on the inner ends of the legs. If these members are of plastic as shown in the embodiment of FIGS. 1-4 they will be moved out from the members 16 by the teeth 18 when the legs are moved outwardly from their closed positions.

Figure 8:
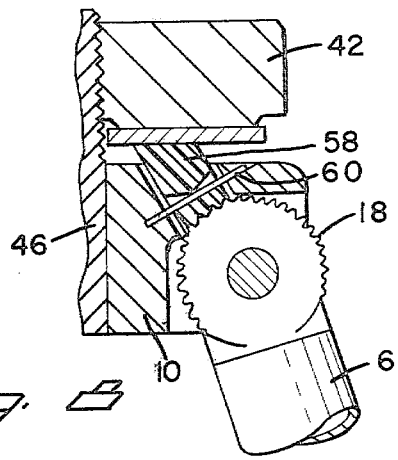
FIGS. 8 and 9 are views of alternative locking dogs.

FIG. 8 shows an alternative form of locking dog 58 which may also be of a firm plastic and which is slidably contained in a recess which extends inwardly from the surface 11 towards the axis of the tripod pin 26. In this embodiment, a leaf spring 60 extends through, and is contained in, a traverse opening in the locking dog and has its projecting ends supported in the hub frame. This leaf spring normally biases the locking dog away from the gear-like member 16 and the dog is moved towards the gear-like member against the biasing force of the spring when the locking nut is moved to its locking position.

Figure 9:
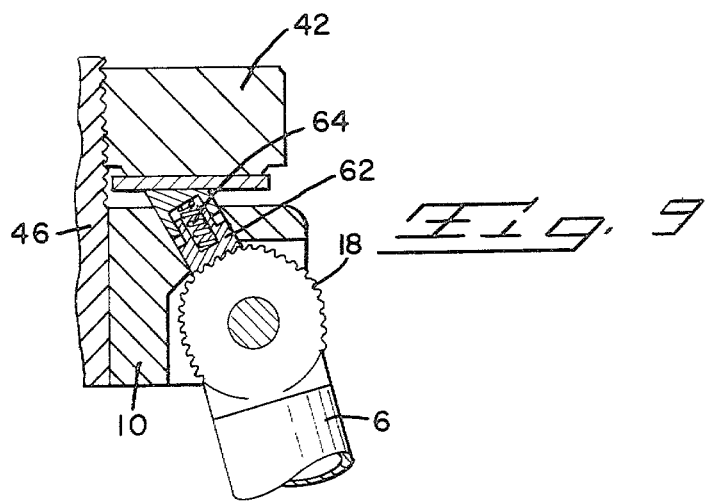

FIG. 9 shows a locking dog 62 composed of two metal parts, one of which is recessed and the other of which has a projection extending into the recess. The two parts are held in assembled relationship to each other by a lost motion connection. A spring 64 is interposed between the parts and normally biasses them to their extended positions. When the locking nut 42 is in its unlocked position as shown in FIG. 9, the end of the locking dog is resiliently biased against the teeth 18 of the member 16. The legs can thus be moved arcuately and a ratching effect will be achieved by the spring biased locking dog thereby to retard somewhat the movement of the legs without preventing it. It is unnecessary to provide the resilient clamping gasket 50 for the embodiments of FIGS. 8 and 9.

I claim:

1. A tripod having a hub assembly and tripod legs pivotally mounted on said hub assembly for arcuate movement from closed positions, in which said legs are parallel to each other and are clustered around a tripod axis which extends through said hub assembly, to extended positions in which said legs extend divergently from said axis, said hub assembly comprising a hub frame and clamping means, said hub frame having recesses therein at spaced intervals around the periphery thereof, each of said legs having an inner end which is received in one of said recesses, said inner end of each leg being independently pivotally mounted on a leg axis which extends transversely of, and is spaced from, said tripod axis, each of said inner ends having a locking portion in said recess, said locking portion comprising a cylindrical surface which has said leg axis as a center, a locking dog means in each of said recesses, each of said locking dog means extending radially with respect to its associated leg axis and being normally spaced from said locking portion of its associated leg, each of said locking dog means being movable independently of the other locking dog means towards and against said cylindrical surface of its associated leg, said clamping means comprising a member movably mounted on said hub frame for movement towards and away from said locking dog means, said clamping means being engageable with all of said locking dog means simultaneously and being effective to move said locking dog means in unison towards their associated locking portions whereby, upon extending said legs and placing said legs on a surface, said legs will assume extended positions with respect to said tripod axis, and upon movement of said clamping means towards said locking dog means, said locking dog means are pushed against said cylindrical surfaces thereby to lock said legs against movement.

2. A tripod as set forth in claim 1, said hub frame having an extension on one side thereof, said clamping means being mounted on said extension for movement towards and away from said hub frame.

3. A tripod as set forth in claim 2, said extension being externally threaded, said clamping means comprising a nut on said extension.

4. A tripod as set forth in either of claims 1 or 3, each of said locking dog means comprising a bar-like locking dog having a first end which is proximate to said cylindrical surface of its associated tripod leg and a second end which is proximate to said clamping means.

5. A tripod as set forth in claim 4, each of said locking dogs being confined in its respective recess for radial movement towards and away from said cylindrical surface of its associated tripod leg, and spring means in each of said recesses normally biasing said locking dogs away from said cylindrical surfaces.

6. A tripod as set forth in claim 5, each of said cylindrical surfaces and said first end of each of said locking dogs having interengageable tooth means thereon.

7. A tripod as set forth in claim 6, having washer means interposed between said clamping means and said second ends of said locking dogs.

8. A universal tripod which can be set up on a level surface, on an irregular surface, and can be set up close to a surface, said tripod comprising:

a tripod hub, tripod legs, and a leg clamping means, said tripod legs being independently pivotally mounted on said hub at equally spaced angular intervals with respect to the central vertical axis of said tripod, each of said legs being independently arcuately movable from a closed position to an extreme extended position, said legs being clustered around said tripod axis when in said closed positions and extending at an angle in the range of about 90 to 120 degrees to said axis when in said extreme extended positions, said leg clamping means comprising three locking dog means and a single locking member, each of said locking dog means being independent of the other locking dog means and being movably mounted in said hub adjacent to one of said legs, said single locking member being movably mounted on said hub for movement between a locking position and an unlocking position, said locking member being effective upon movement from said unlocking position to said locking position simultaneously to engage all of said locking dog means with their associated tripod legs thereby to clamp said legs against arcuate movement whereby, said tripod can be set up on a surface by moving said locking member to said unlocking position, positioning said hub above said surface with said legs extending divergently to said surface, and thereafter moving said locking member to said locking position.

9. A tripod as set forth in claim 8, said locking member comprising a locking nut, said locking nut being threaded on a threaded extension which extends from said tripod hub.

10. A tripod as set forth in claim 9, each of said locking dogs being slidably mounted in said hub.

* * * * *